2 Sheets--Sheet 1.

L. SCHAFER, Jr.
Potato-Diggers.

No. 138,942. Patented May 13, 1873.

Witnesses.
J. B. Connolly
A. Connolly

Inventor.
Lewis Schafer Jr.
per
Connolly Bros.
Attorneys

2 Sheets--Sheet 2.
L. SCHAFER, Jr.
Potato-Diggers.
No. 138,942. Patented May 13, 1873.
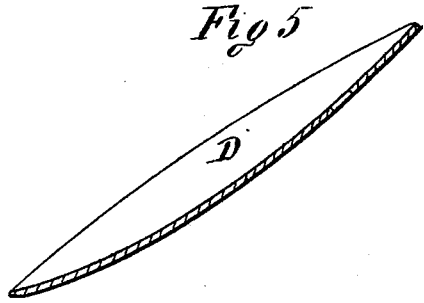
Witnesses
J. B. Connolly
C. Connolly
Inventor
Lewis Schafer Jr
by Connolly Bros,
Attys

UNITED STATES PATENT OFFICE.

LEWIS SCHAFER, JR., OF MOUNT CARMEL, ILLINOIS.

IMPROVEMENT IN POTATO-DIGGERS.

Specification forming part of Letters Patent No. 138,942, dated May 13, 1873; application filed March 27, 1873.

*To all whom it may concern:*

Be it known that I, LEWIS SCHAFER, Jr., of Mount Carmel, in the county of Wabash and State of Illinois, have invented certain new and useful Improvements in Iron-Stock Shovel-Plow with Screen for Digging Potatoes; and I do hereby declare that the following is a full, clear, and exact description thereof, that will enable others skilled in the art to which it appertains to make and use the same, reference being had to the accompanying drawing and to the letters of reference marked thereon, which form a part of this specification.

Figure 1:
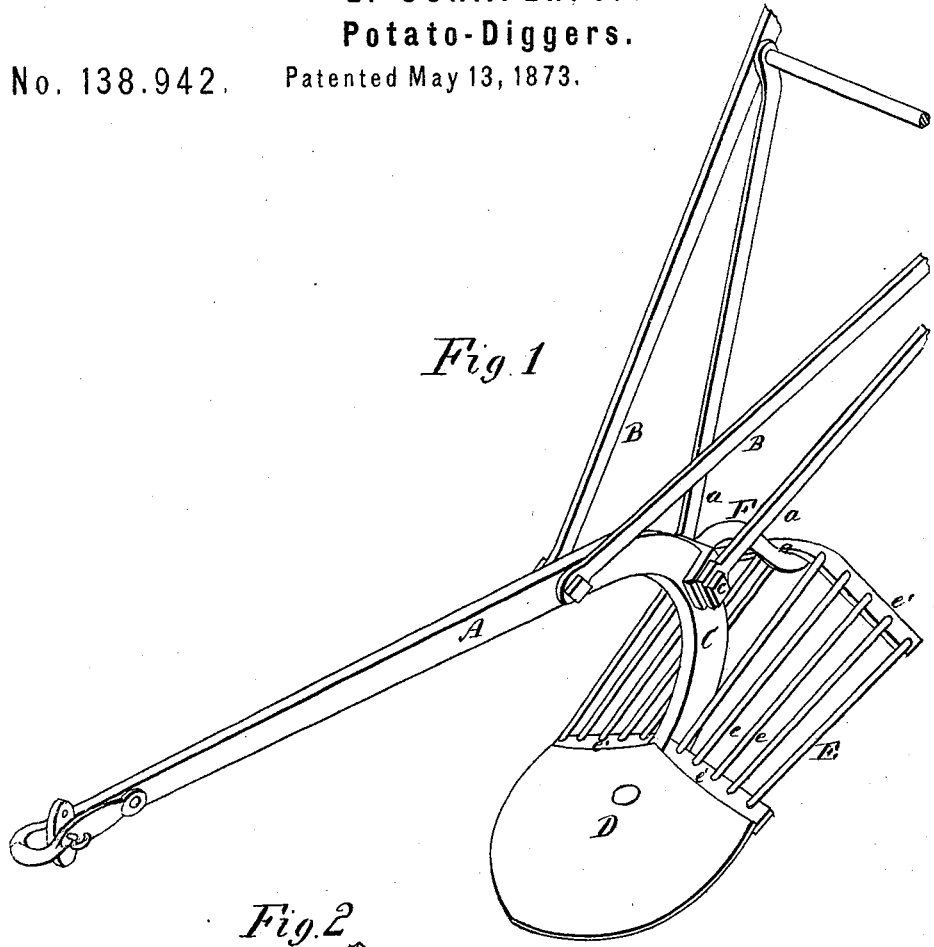
Figure 2:
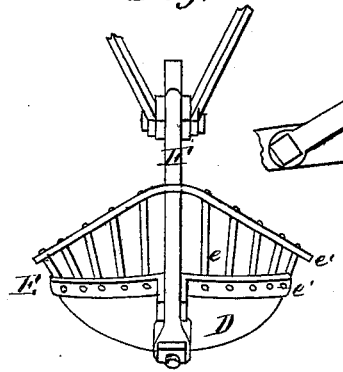
Figure 3:
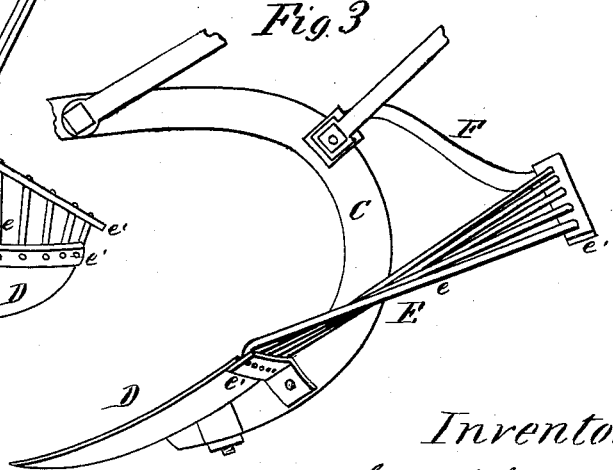

Referring to the drawing, Figure 1 is a perspective view of my invention. Fig. 2 is a rear-end view, and Fig. 3 is a side view, of the same. Fig. 4 is a longitudinal sectional view of the concave shovel, and Fig. 5, a transverse sectional view of the same.

My invention relates to potato plows or diggers. The object of my invention is to provide a plow or digger of simple construction and slight cost, and which at the same time will be thoroughly effective in operation, and not liable to get out of order.

My improvements relate to the construction, combination, and arrangement of the different parts, as hereinafter fully described. I employ a curved beam, provided with suitable handles, and terminating in a standard, to which the scoop or shovel and sifting devices or screen are secured. The shovel is formed concave longitudinally and transversely, so that the earth and other matter raised thereby will be passed back to the screen to be sifted. The screen is formed of a series of metal rods, attached to transverse bars at each extremity, these rods being arranged on each side in such relation that they form a curved incline, resembling, to some extent, the mold-board of a plow, whereby the earth is raised and separated from the potatoes, which, with the clods, roll down on each side of the hill, the fine earth passing through the rods. The plow-handles and screen are provided with braces, secured by a single bolt to the standard.

Referring to the accompanying drawing, which illustrates a potato-digger constructed with my improvements, A is the beam, provided with handles B B, and terminating in a curved standard, C. D is the shovel, made concave longitudinally and transversely, as shown, and secured to the standard by a rivet and bolt, or by equivalent means. E represents the screen, consisting of a series of iron rods, $e\ e$, secured at each extremity to the transverse bars $e'\ e'$, and so arranged in relation to each other that a double incline is formed, as plainly shown in the drawing, the front of the screen being slightly concave, while the rear portion is convex, or raised in the center and sloping to the sides. F represents a brace supporting the rear end of the screen, and $a\ a$ are braces for the handle, secured to the standard by a single bolt, $c$.

What I claim as my invention, and desire to secure by Letters Patent, is—

1. The potato-digger herein described, having the beam A, standard C, concave shovel D, and double-inclined screen E, as set forth.

2. The combination of the screen and handle-braces F and $a\ a$ with the standard C, said braces being secured to the standard by a single bolt, as shown and described.

In testimony that I claim the foregoing I have hereunto set my hand this 5th day of March, 1873.

LEWIS SCHAFER, JR.

Witnesses:
JAMES S. JOHNSTON,
JAMES B. RAMSEY.